United States Patent
Lanzkron et al.

(10) Patent No.: US 10,303,349 B2
(45) Date of Patent: May 28, 2019

(54) IMAGE-BASED APPLICATION AUTOMATION

(75) Inventors: Mordechai Lanzkron, Kfar Etzion (IL); Dror Saaroni, Yehud (IL); Yonathan Livny, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 187 days.

(21) Appl. No.: 14/373,815

(22) PCT Filed: Jan. 26, 2012

(86) PCT No.: PCT/US2012/022748
§ 371 (c)(1),
(2), (4) Date: Jul. 22, 2014

(87) PCT Pub. No.: WO2013/112160
PCT Pub. Date: Aug. 1, 2013

(65) Prior Publication Data
US 2015/0074609 A1    Mar. 12, 2015

(51) Int. Cl.
*G06F 3/048* (2013.01)
*G06F 3/0484* (2013.01)
*G06F 9/455* (2018.01)

(52) U.S. Cl.
CPC ...... *G06F 3/04845* (2013.01); *G06F 3/04842* (2013.01); *G06F 9/45512* (2013.01)

(58) Field of Classification Search
CPC .................................................. G06F 3/04842
USPC ........................................................ 715/828
See application file for complete search history.

(56) References Cited

U.S. PATENT DOCUMENTS

| | | | |
|---|---|---|---|
| 7,099,893 B2 | 8/2006 | Bischof et al. | |
| 7,565,607 B2 | 7/2009 | McGlinchey et al. | |
| 7,694,181 B2 | 4/2010 | Noller et al. | |
| 8,031,950 B2 | 10/2011 | Cavanaugh et al. | |
| 8,042,134 B2 | 10/2011 | Atsushi et al. | |
| 8,060,791 B2 | 11/2011 | Hayutin | |
| 2009/0125463 A1 | 5/2009 | Hido | |
| 2009/0150813 A1* | 6/2009 | Chang ............... | G06F 3/0481 715/764 |
| 2009/0287643 A1 | 11/2009 | Corville et al. | |

(Continued)

FOREIGN PATENT DOCUMENTS

| | | |
|---|---|---|
| CN | 101276282 A | 10/2008 |
| JP | 2007324755 | 12/2007 |

(Continued)

OTHER PUBLICATIONS

Supplementary European Search Report, dated Sep. 23, 2015, European Patent Application No. 12866445.5, 6 pages.

(Continued)

*Primary Examiner* — Tadesse Hailu
*Assistant Examiner* — Darrin Hope (57) ABSTRACT

In one implementation, an image-based application automation system determines that a first image from a plurality of images associated with an input event does not satisfy any portion of a graphical user interface at a first time. The image-based application automation system then selects, independent of user input, a second image from the plurality of images after the first time, and identifies a portion of the graphical user interface satisfied by the second image.

11 Claims, 7 Drawing Sheets

(56) References Cited

U.S. PATENT DOCUMENTS

| | | |
|---|---|---|
| 2010/0229112 A1 | 9/2010 | Ergan et al. |
| 2011/0047488 A1* | 2/2011 | Butin ................. G06F 3/04842 |
| | | 715/762 |
| 2011/0126158 A1* | 5/2011 | Fogarty ................ G06F 3/0481 |
| | | 715/835 |
| 2011/0131551 A1* | 6/2011 | Amichai ............ G06F 11/3668 |
| | | 717/125 |
| 2011/0231823 A1 | 9/2011 | Fryc et al. |
| 2012/0243745 A1* | 9/2012 | Amintafreshi ...... G06F 11/3688 |
| | | 382/103 |

FOREIGN PATENT DOCUMENTS

| | | |
|---|---|---|
| JP | 2008003649 | 1/2008 |
| WO | WO-2006016866 A2 | 2/2006 |
| WO | WO-2011062597 A1 | 5/2011 |

OTHER PUBLICATIONS

International Preliminary Report on Patentability, dated Aug. 7, 2014, PCT Patent Application No. PCT/US2012/022748; The International Bureau; Geneva, Switzerland.

Dustin, E., Image Based Automated Software Testing, (Research Paper), Automated Software Testing Magazine, Mar. 2011, vol. 3, No. 1.

Image-based Automation, (Web Page).

Korean Intellectual Property Office, International Search Report and Written Opinion, Jan. 31, 2013, 10 pages, Daejeon Metropolitan City, Republic of Korea.

\* cited by examiner

IMAGE-BASED APPLICATION AUTOMATION

BACKGROUND

Some image-based application (or software) automation systems include a record phase and a playback phase. During the record phase, an image-based application automation system records actions for an application that will be automated during a playback phase. For example, an image-based application automation system detects input events at a graphical user interface and captures an image of the graphical user interface in response to each input event. Often, the image-based application automation system then defines an automation action for each input event that specifies the image for that input event, and automation actions defined during the record phase are stored within a script file.

During the playback phase, the image-based application automation system performs the actions recorded during the record phase. For example, the image-based application automation system can identify the automation actions in the script file and replay the input events specified in the automation actions. That is, for each automation action, the image-based application automation system identifies a portion of a graphical user interface of the application that matches the image specified in that automation action and performs the input event at that portion of the application.

DETAILED DESCRIPTION

Image-based application (or software) automation systems can suffer from failures when such systems are unable to match an image related to an input event with a portion of a graphical user interface. For example, an input event can be relative to (or performed at) a graphical user interface element that has multiple states (e.g., visual appearances). As a specific example, the input event can be relative to a button control that has a first visual appearance when a cursor (e.g., a mouse pointer) does not hover over the button control, and a second visual appearance when the cursor hovers over the button control. Accordingly, an image of the button control that is captured in response to an input event such as a mouse button down input event at the button control will include the button control in the second visual appearance (or state) because the mouse pointer hovers over the button control when a mouse button down input event is performed at the button control.

However, during a replay phase, the mouse pointer may not be hovering over the button control when the image-based application automation system attempts to replay an automation action including the mouse button down input event (e.g., replay the mouse button down input even specified at the automation action) at the button control. As a result, the button control is in the first visual appearance, but the image for the mouse button down input event includes the button control in the second visual appearance. Thus, the image-based application automation system will likely fail to match the image with the button control, and the replay phase will fail for this automation action.

Implementations discussed herein determine that a graphical user interface does not include a portion that is satisfied by one image associated with an input event, and automatically (i.e., independent of input from a user) determine whether the graphical user interface includes a portion that is satisfied by another image associated with the input event.

For example, each image in a group of images can include a graphical user interface element at which an input event should be performed during a replay phase of an image-based application automation system in one of a variety of states. One of the images can be designated as a target for the input event. If, during the replay phase, the image designated as the target does not satisfy any portion of a graphical user interface, a different image can be selected from the group of images. If that image satisfies a portion of a graphical user interface, the input event can be replayed at the portion of a graphical user interface. In some implementations, that image can also be designated as the target for the input event. If that image does not satisfy any portion of a graphical user interface, yet another image from the group of images can be selected. This process can be repeated until an image which satisfies (or matches) a portion of a graphical user interface is found or all the images in the group of images have been selected.

Figure 1:
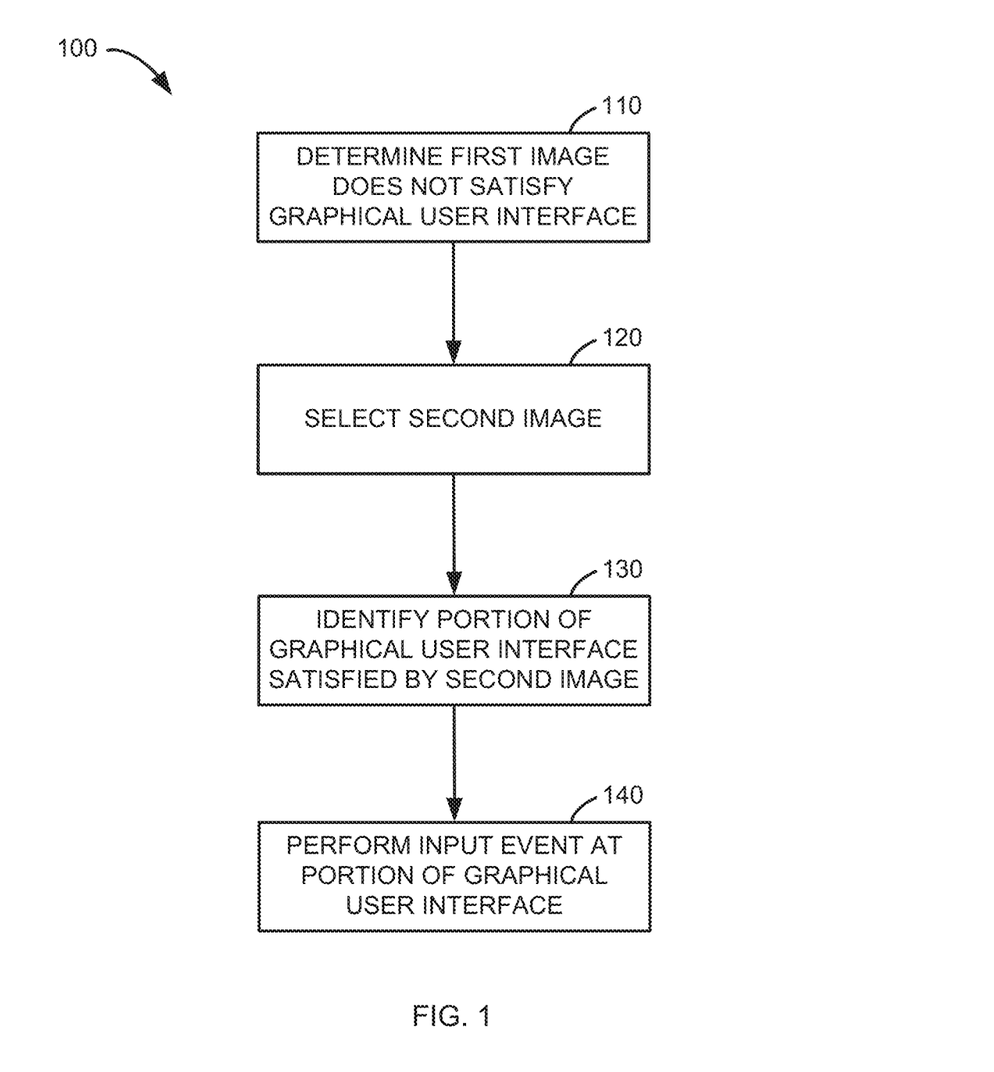
FIG. 1 is a flowchart of a process to perform an input event, according to an implementation.

FIG. 1 is a flowchart of a process to perform an input event, according to an implementation. Process 100 can be executed or hosted, for example, at an image-based application automation system such as the image-based application automation system illustrated in FIG. 7 or FIG. 8. An image-based application automation system implementing process 100 determines, at block 110, that a graphical user interface (GUI) is not satisfied by a first image associated with or related to an input event. In other words, the image-based application automation system determines that the GUI does not include any portion that is matched by the first image.

As used herein, the term "image" means a representation of some subject (e.g., a GUI, a portion of a GUI, or a GUI element) that is based on the visual appearance of the subject. Moreover, a copy or transform (e.g., altered color space, size, aspect, or ratio) of an image of a subject is also an image of the subject.

Furthermore, as used herein, an image is said to satisfy (or match) a portion of a GUI if the image includes a representation of that portion of the GUI. Said differently, an image satisfies a portion of a GUI if the image includes that portion of the GUI. The portion of the GUI (or representation thereof) included in the image can have a different color scheme (e.g., grayscale rather than color), different proportions, different scale (e.g., be of a different size), or have other visual variations in the image as compared to the portion of the GUI itself, and the image can nevertheless be said to satisfy the portion of the GUI (or the GUI). For example, the image-based application automation system can use image processing techniques such as edge detection, text or symbol recognition, Hamming distance evaluation, pixel value comparison, resizing, feature comparison, and/or other methodologies to compare an image to a portion of a GUI (or another image representing the portion of the GUI) in order to determine that the first images does not satisfy any portion of the GUI.

The first image can fail to satisfy any portion of the GUI for a variety of reasons. For example, the first image can include a GUI element in a first state such as a visual appearance when a cursor (e.g., a mouse pointer) hovers over the GUI element. When block 110 is processed at the image-based application automation system, that GUI element can be in a different state. For example, the cursor can be hovering over a different GUI element. Accordingly, the first image does not satisfy that GUI element because the visual appearance of the GUI element in the first image does not match the visual appearance of the GUI element at the GUI at that time.

In response to block 110, the image-based application automation system selects a second image associated with the input event at block 120. For example, the image-based application automation system can select a second image from a group of images associated with an input event based on a priority among the images; based on rules, parameters, or preferences; or using other methodologies according to which the second image is selected. For example, each of the images can have an associated timestamp (e.g., an absolute or relative to the input event time at which the image was generated or captured), and the first image can be designated as a target of the input event. The image-based application automation system can select as the second image the image from the group of images that immediately before or after (in time) the first image.

In some implementations, the image-based application automation system selects the second image independent of user input. As used herein, the terms "independent of user input," "independent of a user," and similar terms or phrases mean that an action occurs in response to a stimulus other than user input. Here, for example, the stimulus is the determination that the first image does not satisfy a portion of the GUI.

Said differently, the image-based application automation system determines that the first image does not satisfy the GUI at block 110, and proceeds to select the second image at block 120 without real-time (e.g., received between blocks 110 and 120 or as part of block 120) user input. This is not to suggest that prior user input does not or cannot affect the selection of the second image. For example, the image-based application automation system can select the image selected based on earlier user input such as, for example, user input to establish a priority among a group of images associated with the input event or rules, parameters, or preferences according to which the second image is selected. Thus, although criteria for the selection can be specified by user input, the selection is made by the image-based application automation system independent of user input.

After the second image is selected, a portion of the GUI that is satisfied by the second image is identified at block 130. In other words, using image analysis techniques or methodologies such as those discussed above in relation to block 110, the image-based application automation system identifies a portion of the GUI that the second image satisfied.

For example, as discussed above, the first image can include a GUI element in a first state, and the GUI element can be in a second state when block 110 is executed. The second image can include the GUI element in the second state. In other words, the first image can include the GUI element (or portion of the GUI) in one state and the second image can include the GUI element in another state. Accordingly, images associated with an input event can each include a GUI element (or portion of a GUI) at which an input event is to be performed in one or a variety of states. Thus, the image-based application automation system can use these images to identify that GUI element, for example, even though that GUI element has multiple possible states.

The input event is then performed, at block 140, at the portion of the GUI identified at block 130. In other words, the input event with which the group of images including the first image and the second image is associated is performed relative to the portion of the GUI identified at block 130.

An input event can be performed at (or relative to) a portion of a GUI using a variety of methodologies. For example, an image-based application automation system can request emulation or triggering of an input event such as a mouse button click event, a key down event, a gesture event, or some other input event at an operating system hosting an application at which the GUI is implemented. As another example, the image-based application automation system can trigger an input event at a desktop sharing system or application such as Microsoft Remote Desktop Connection™ (RDC) or Virtual Network Computing (VNC) by sending a command or instruction to the desktop sharing system (e.g., to a server application of the desktop sharing system). As yet another example, the image-based application automation system can inject a command, signal, or data set representing the input event into an input event queue for an operating system or the application at which the GUI is implemented.

Process 100 illustrated in FIG. 1 is an example implementation. In other implementations, process 100 can include additional and/or different blocks or steps. For example, process 100 can include a translation block between blocks 130 and 140 at which a coordinate system for the GUI relative to the image-based application automation system is translated into a coordinate system relative to, for example, an operating system at which an application implementing the GUI is hosted. As a specific example, the image-based application automation system can access the GUI via a desktop sharing system, and the resolution of the GUI as accessed via the desktop sharing system can be reduced relative to the actual resolution of the GUI. The image-based application automation system can translate or map (e.g., using a linear transformation) a position (e.g., Cartesian coordinate location) at which the input event should be performed from a space defined by the resolution of the GUI as accessed via the desktop sharing system to a space defined by the actual resolution of the GUI.

Figure 2:
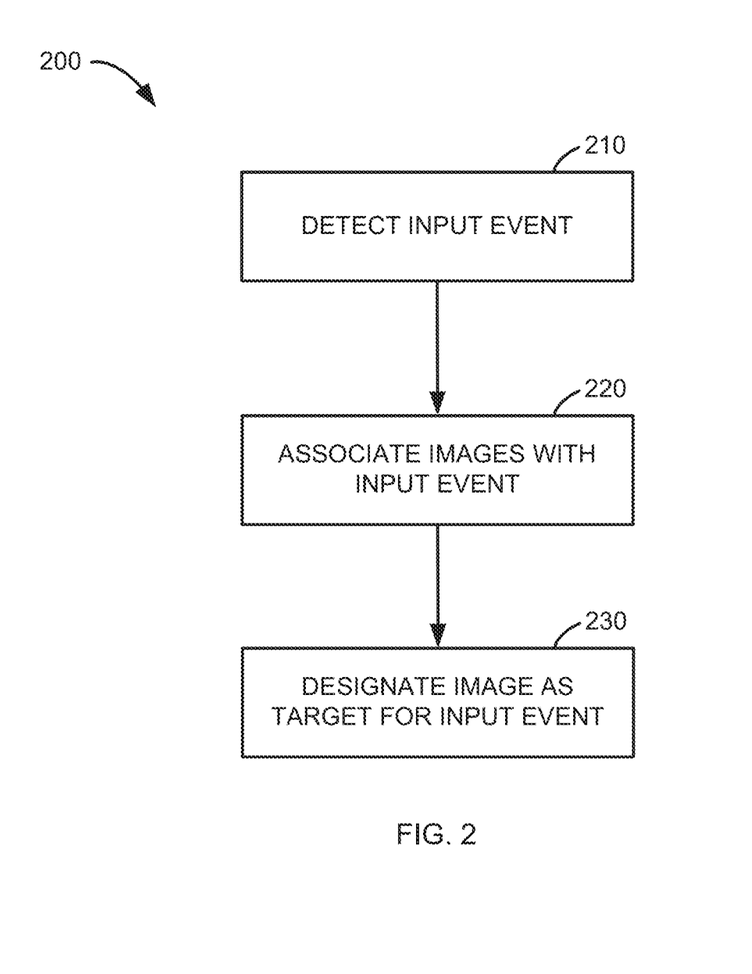
FIG. 2 is a flowchart of a process to associate a group of images with an input event, according to an implementation.

FIG. 2 is a flowchart of a process to associate a group of images with an input event, according to an implementation. An input event is detected at block 210. An input event is an occurrence of input at a system such as a computing device. For example, an input event can be generated, for example, based on: movement of an input device such as a mouse pointer; interaction with (e.g., touching, performing gestures at, or movement relative to) a trackpad, touch-sensitive display, or proximity sensitive device; a mouse or keyboard button action (e.g., depression or release of a mouse button); or other input such as input from a motion-sensitive device (e.g., an accelerometer or gyroscope) or audio input device (e.g., a microphone).

Such inputs events are often performed relative to a graphical user interface (GUI) or elements of a graphical user interface (GUI elements). For example, a user can interact with a GUI element (e.g., using a mouse or touch-sensitive device click on the GUI element) to generate an input event relative to that GUI element. As another example, a GUI element can have or be the input focus of a GUI (e.g., in response to previous user selection of that GUI element), and input events that occur or are detected while that GUI has the input focus are relative to that GUI element. Accordingly, input events can be referred to as being relative to, occurring at, or performed at portions of a GUI or at GUI elements.

A GUI is a user interface that allows a user to interact with a system (e.g., a computing device) using graphical representations of objects rather than textual commands. For example, a user can move a cursor to a graphical representation of a button and press and release the graphical representation of the button using a mouse or touch-sensitive device.

Such graphical representations are referred to herein as graphical user interface elements (or GUI elements). A GUI element is a portion of a GUI at which a user can provide input to the GUI. For example, a GUI element can be a control such as, a pushbutton or button, a radio button, a check box, a text field or box, a dropdown list, a spinner (or spin control), a slider, an icon, a tree control, a scroll bar, a hyperlink, or some other control. As another example, a GUI element can be a GUI container that can include other GUI elements such as a window, a view, a dialog box, a frame, a tab, a menu, or some other container.

Often, a coordinate system such as a Cartesian coordinate system is associated with a GUI. For example, the upper-left corner of the GUI can be designated as the origin and described using the tuple (0, 0). Each point (often corresponding to each pixel of a display such as a computer monitor at which the GUI is output) of the GUI can then be described using as coordinates relative to the origin. For example, for a GUI displayed at a computer monitor with a resolution of 2,920 by 2,080 pixels, the point in the upper-left corner of the GUI is described as (0, 0), the point in the lower-left corner of the GUI is described as (0, 2,080), the point in the upper-right corner of the GUI is described as (1,920, 0), and the point in the lower-right corner of the GUI is described as (1,920, 2,080). Accordingly, input events can include a description of the location (or locations) at the GUI an input event occurred. For example, an input event for movement of a cursor can specify one set of coordinates indicating where the movement began (e.g., the position of the cursor before the movement) and another set of coordinates indicating where the movement ended.

The image-based application automation system implementing process 200 can detect input events at block 210 using a variety of methodologies. For example, an image-based application automation system can register with an operating system (e.g., using an application programming interface (API) of the operating system) to receive a notification or signal such as a system signal, a function call, or method invocation that includes a description of an input event (e.g., an identifier of a type of class of the input event, a description of the input event such as which button was pressed at a keyboard, and/or a location of the input event). As another example, an image-based application automation system can communicate with one or more device drivers to receive notifications or signals when peripheral devices (e.g., a mouse, a touch- or proximity-sensitive device such as a trackpad, a physical keyboard, or a virtual keyboard such as an on-screen keyboard) provide signals or notifications to a computing device to indicate that an input event has occurred at those peripheral devices. As yet another example, an image-based application automation system can instrument an operating system (e.g., hook input event handling routines of the operating system or provide a device driver) to intercept notifications or signals that are related to input events and are generated by the operating system or device drivers.

After the input event is detected at block 210, multiple images are associated with the input event at block 220. In other words, the image-based application automation system implementing process 200 defines or establishes a relationship between the input event and two or more images. For example, a description of the input event and identifier of each image (e.g., universal resource identifier (URI), file-system path, or filename) to be associated with the input event can be stored at an automation action. An automation action represents an input event to be replayed during a replay phase. As examples, an automation action can be represented or stored as a portion of a script file, an Extensible Markup Language (XML) element or group of XML elements, or a data structure at an image-based application automation system. Automation actions are discussed in more detail, for example, in FIG. 5.

In some implementations, the images associated with the input event are generated chronologically at various times during a record phase or are based on such images. For example, the image-based application automation system implementing process 200 can generate images of a GUI (e.g., perform a screen capture or a screenshot relative to the GUI) at an interval such as every other second or every 300 milliseconds. Alternatively, for example, the image-based application automation system implementing process 200 can generate images of a GUI in response to input events such as movement input events.

In some implementations, each image generated during a record phase is cached or archived by the image-based application automation system. In some implementations, an image-based application automation system implementing process 200 includes a fixed-length queue in which the most recently generated images are stored. Furthermore, in some implementations, the image-based application automation system implementing process 200 also generates an image of the GUI in response to the input event detected at block 210. Moreover, the image-based application automation system implementing process 200 can continue to generate images of the GUI after an input event is detected.

The number of images associated with an input event can vary according to various implementations based on, for example, a type or class of an input event, a user-defined or -configurable parameter, a predefined parameter, or other criteria. Additionally, the images associated with an input event include the portion of a GUI or GUI element at which the input event was performed. For example, as discussed above, the images associated with the input event can include a portion of a GUI or GUI element in different states. Moreover, the images associated with an input event can be centered at the location at which the input event occurred. More specifically, for example, an image-based application automation system can identify the location of the input event at the GUI based on location information included in a description of that input event or a previous input event.

The image-based application automation system can then generate a group of images to be associated with the input event. For example, the image-based application automation system can identify a portion of the GUI or a GUI element that surrounds the location. As a specific example, using edge detection or other image processing analysis methodologies, the image-based application automation system can identify a GUI element that includes or surrounds the location. As another example, the image-based application automation system can identify a portion of the GUI by defining a rectangle, ellipse, polygon, or other shape including or centered at the location. The image-based application automation system can then generate a group of images including the portion of the GUI or GUI element by, for example: accessing two images that were captured before the input event, an image captured in response to the input event, and an image captured after the input event; generating copies of those images; and cropping the image copies about the identified portion of the GUI or GUI element (e.g., based on the coordinate system of the GUI scaled as appropriate for each image). The cropped images can then be associated with the input event as discussed above, and/or stored at a data store.

As discussed above, the image copies can be cropped to have various dimensions or shapes according to various implementations. Moreover, the image copies can be cropped about a location (or point) other than the location of the input event. In other words, the cropped image copies can be centered at a location of the GUI other than the location of the input event. In such implementations, the image-based application automation system replays the input event during a replay phase at a location appropriately offset from the center of such images such that the input event is replayed at the same location as the location at which the input event occurred during the record phase. As used herein, a second location is the same as a first location if the second location is identical to the first location or is sufficiently similar or close to the first location that an input event at the second location has the same effect at a GUI or GUI element as that input event at the first location.

An image from the images associated with the input event at block 220 is then designated as a target for the input event at block 230. The target for the input event is the image that should be used during a replay phase to identify the portion of a GUI to which the input event with which that image is associated should be applied or performed.

The target can be designated using a variety of methodologies. For example, an image generated in response to the input event can be designated as the target for the input event by listing an identifier of that image first in a list of images associated with the input event at an automation action for that input event. In other implementations, an automation action can include a field at which an identifier (e.g., an input event identifier) of the image that is the target for the input event can be included. As yet another example, a target flag or attribute can be set for the image that is the target for the input event, and a target flag or attribute can be reset for each other image associated with the input event.

Additionally, the image designated as the target for the input event can be selected based on a variety of methodologies. For example, an image generated after the input event can be designated as the target. As another example, the image generated in response to the input event can be designated as the target. As yet another example, an image generated a predetermined number of seconds or milliseconds before or after the input event can be designated as the target.

Process 200 illustrated in FIG. 2 is an example implementation. In other implementations, such a process can include additional blocks or steps. For example, in some implementations, process 200 can include an additional block at which an automation action including or identifying an input event and associated images is defined. Moreover, blocks 210 and 220 can be repeated for each input event in a group of input events. Furthermore, in some implementations, input events can be detected with which images are not associated. For example, some input events such as input events for input from a keyboard (e.g., for keystrokes) are applied to a portion of a GUI or a GUI element which has or is the current input focus of the GUI, and, therefore, the image-based application automation system replaying such input events need not identify that portion of the GUI or that GUI element to replay such input event.

Figure 3A:
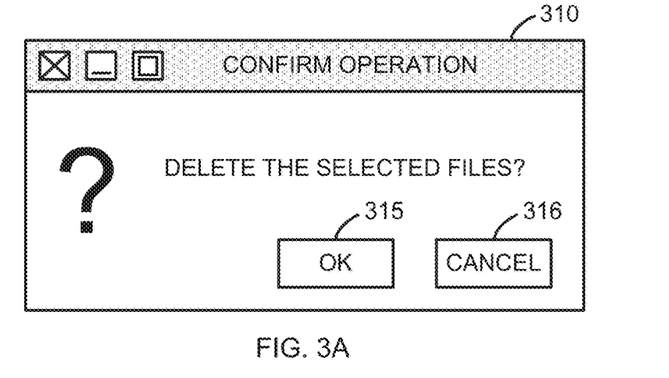
FIG. 3A is an illustration of a portion of a graphical user interface with a graphical user interface element in a first state, according to an implementation.
Figure 3B:
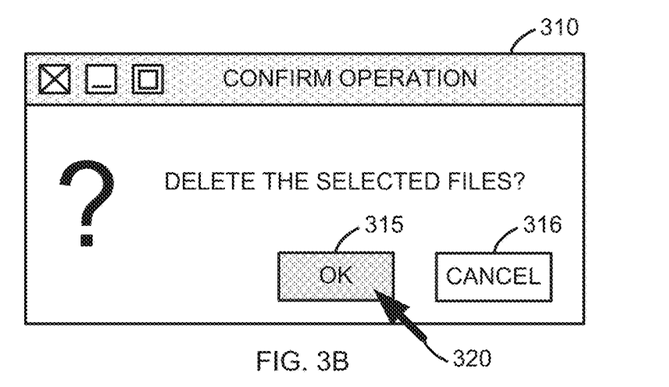
FIG. 3B is an illustration of the portion of the graphical user interface of FIG. 3A with the graphical user interface element in a second state, according to an implementation.
Figure 3C:
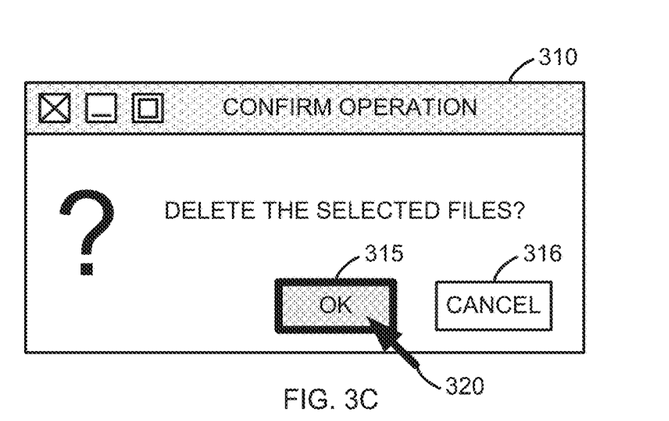
FIG. 3C is an illustration of the portion of the graphical user interface of FIGS. 3A and 3B with the graphical user interface element in a third state, according to an implementation.

FIGS. 3A, 3B, and 3C are illustrations of a portion of a graphical user interface with a graphical user interface element in a first state, in a second state, and in a third state, respectively, according to an implementation. Window 310 is a GUI element that includes buttons (GUI elements) 315 and 316. Although the GUI elements in the example illustrated in FIGS. 3A, 3B, and 3C are buttons, other GUI elements can be used in other implementations. Cursor 320 is a cursor such as a mouse pointer via which a user can interact with window 310, button 315, and/or button 316.

Button 315 has various states including the first state illustrated in FIG. 3A, the second state illustrated in FIG. 3B, and the third state illustrated in FIG. 3C. The states of button 315 are different visual appearances of button 315, and are used to provide an indication (e.g., to a user) of the current status of button 315. In the example illustrated in FIGS. 3A, 3B, and 30, button 315 is in the first state when cursor 320 is not interacting with button 315 (FIG. 3A), is in the second state when cursor 320 hovers or is at button 315 (FIG. 3B), and is in the third state when a mouse button down event occurs and cursor 315 hovers at button 315 (FIG. 3C).

As discussed above, because the state (or visual representation) of GUI elements of an application with respect to which automation actions will be replayed (or the input events specified in those automation actions are specified) can change during execution of that application, image-based application automation systems can fail to identify a portion of the application (output using a GUI) at which an automation action should be replayed because the image specified in that automation action includes that portion of the application in one state, but that portion of the application is currently (i.e., when the automation action should be replayed) in a different state.

An image-based application automation system implemented according to implementations discussed herein can generate multiple images of a GUI (or portions thereof) during a record phase. For example, such an image-based application automation system can generate a group of images of window 310 that includes at least one image of button 315 in the first state and at least one image of button 315 in the second state by periodically capturing screenshots of the application including window 310 or by capturing screenshots in response to input events such as movement input events. Moreover, the image-based application automation system can detect an input event when a mouse down event occurs at button 315 (e.g., when cursor 320 hovers at button 315), and can generate an image that includes button 315 in the third state in response to that input event.

Additionally, in response to the input event, the image-based application automation system can crop images (e.g., each image or a subset of the images such as every other image or every $n^{th}$ image) from those images about the location of the input event. For example, a notification from an operating system of a computing device hosting the application can provide a notification to the image-based application automation system that includes coordinates of the input event. The image-based application automation system can then crop images to generate a second group of images of the GUI element to which the input event was relative, and can associate the second group of images with the input event (e.g., at an automation action).

Figure 4A:
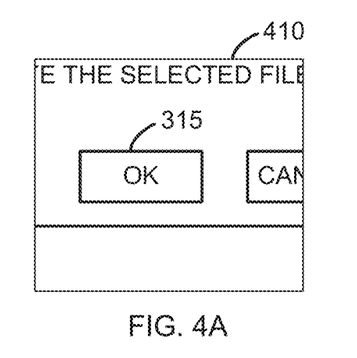
FIG. 4A is an illustration of an image including the graphical user interface element of FIG. 3A, according to an implementation.
Figure 4B:
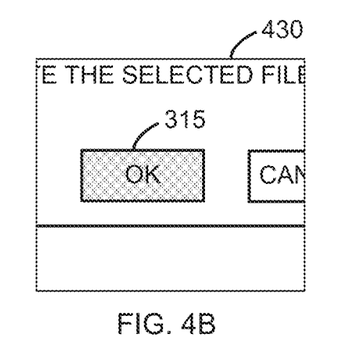
FIG. 4B is an illustration of an image including the graphical user interface element of FIG. 3B, according to an implementation.
Figure 4C:
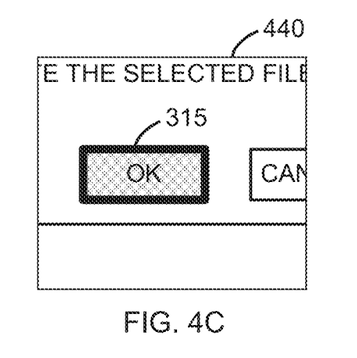
FIG. 4C is an illustration of an image including the graphical user interface element of FIG. 3C, according to an implementation.

FIGS. 4A, 4B, and 4C are illustrations of images including button 315 in the states illustrated in FIGS. 3A, 3B, and 3C, respectively, according to an implementation. Said differently, FIGS. 4A, 4B, and 4C illustrate the second group of images associated with the input event, as discussed above. Image 410 includes button 315 in the first state and a portion of window 310. Similarly, image 420 includes button 315 in the second state and a portion of window 310, and image 430 includes button 315 in the third state and a portion of window 310. In the example illustrated in FIGS. 4A, 4B, and 4C, the center of each of images 410, 420, and 430 is generally or substantially at the location of cursor 320 when the input event was detected (e.g., at the location identified by an operating system of a computing device hosting the application as the location of the input event).

Figure 5:
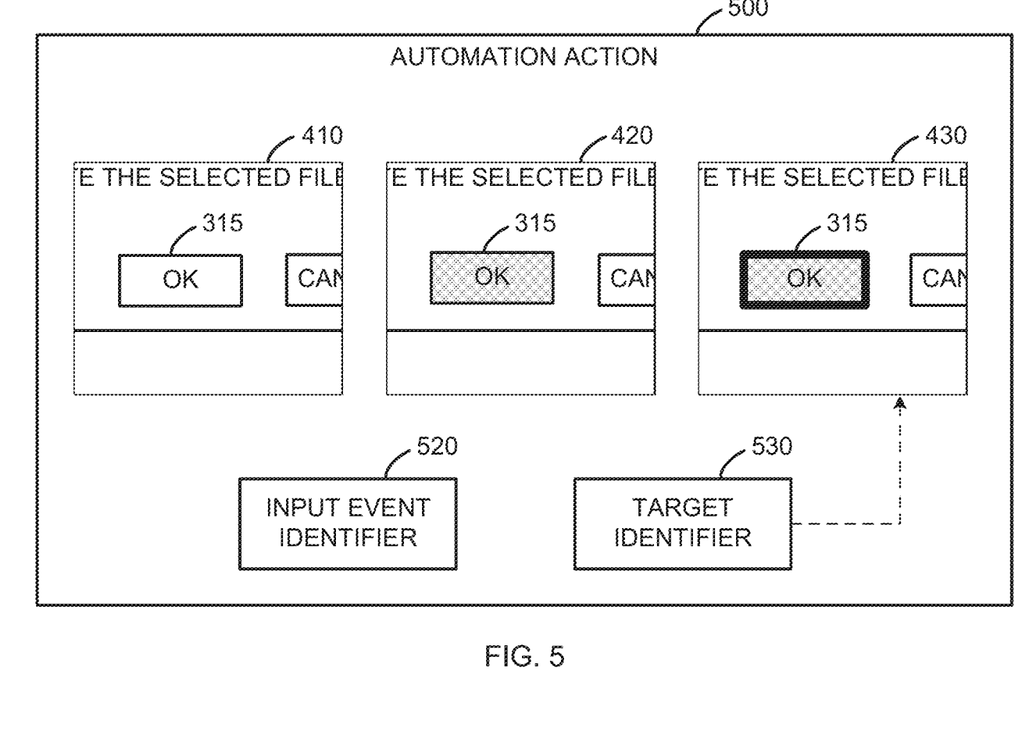
FIG. 5 is an illustration of an automation action, according to an implementation.

FIG. 5 is an illustration of an automation action, according to an implementation. As discussed above, an automation action represents an input event to be replayed during a replay phase. As examples, an automation action can be represented or stored as a portion of a script file, an Extensible Markup Language (XML) element or group of XML elements in an XML document, or a data structure at a memory accessible to an image-based application automation system.

Automation action 500 includes images 410, 420, and 430 discussed above in relation to FIGS. 3A, 3B, 3C, 4A, 4B, and 4C. In some implementations, automation action includes references to images 410, 420, and 430 (e.g., URIs or filesystem paths of images 410, 420, and 430) rather than the images themselves. For example, images 410, 420, and 430 can be stored at a database or other data store, and automation action can be represented by an XML document. Thus, an image-based application automation system can interpret the XML document, and access images 410, 420, and 430 at the database using the references to images 410, 420, and 430 included at automation action 500.

Input event identifier 520 identifies the input event with which automation action 500 is associated. In other words, input event identifier 520 identifies the input event to which images 410, 420, and 430 are related. Input event identifier 520 can be, for example, an identifier that uniquely identifies an input event from other input events. More specifically, for example, a unique identifier can be associated with or assigned to each type or class of input event, and the unique identifier of the type of input event that is associated with automation action 500 is used as input event identifier 520.

In addition to images (or references to images) automation action 500 includes target identifier 530. Target identifier 530 is an identifier of or reference to a target (or to an image designated as a target) for the input event associated with automation action 500. As illustrated in FIG. 5, target identifier 530 references or identifies image 430. In some implementations, an image-based application automation system can modify or update target identifier 530 to reference or identify another image such as image 420 or 410.

Figure 6:
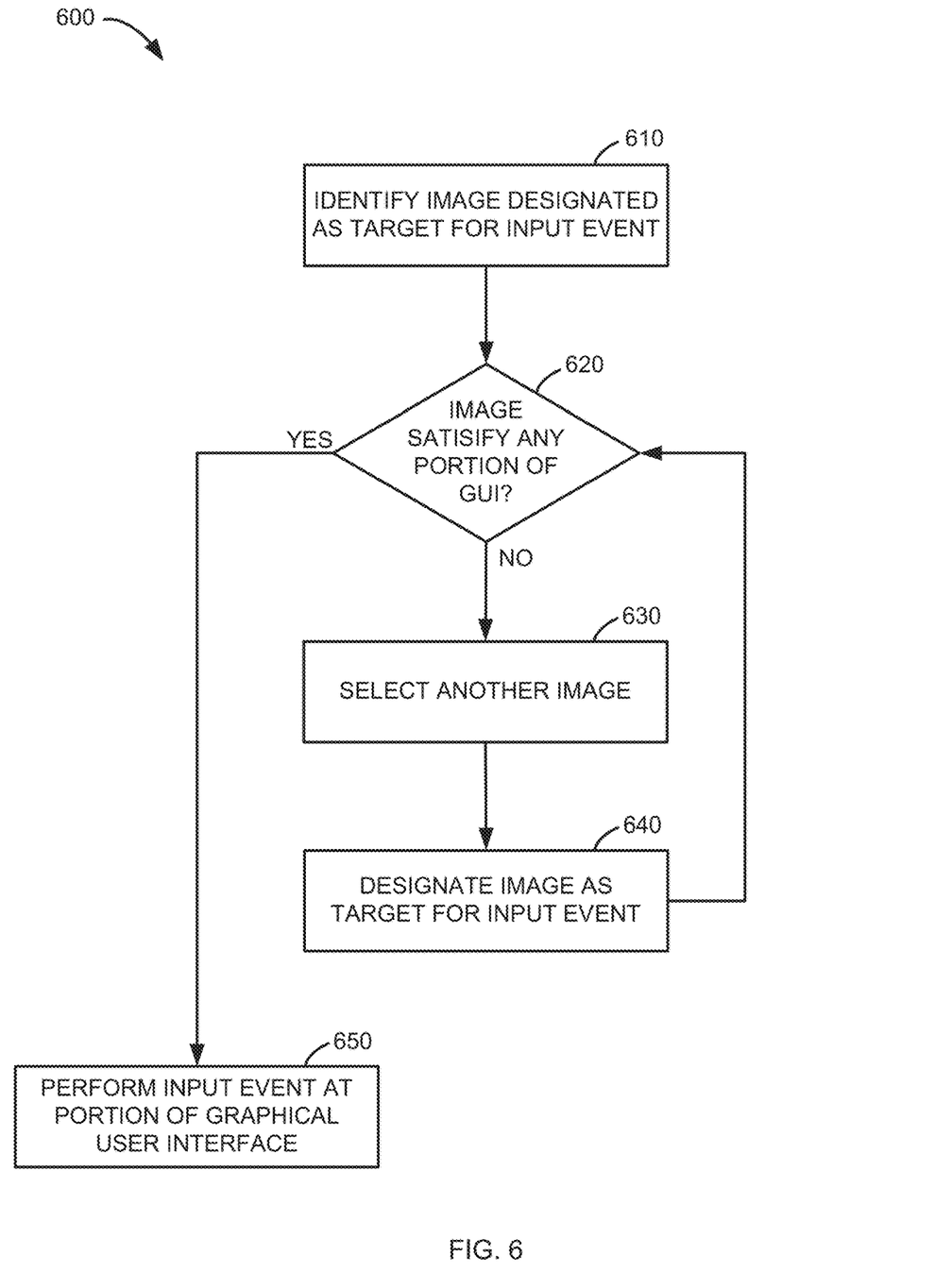
FIG. 6 is a flowchart of a process to designate an image as a target for an input event, according to an implementation.

FIG. 6 is a flowchart of a process to designate an image as a target for an input event, according to an implementation. An image-based application automation system implementing process 600 identifies an image designated as a target for an input event at block 610. For example, the image-based application automation system can access a target identifier at an automation action stored at a memory, and access the image referenced by the target identifier. In other implementations, the image-based application automation system can access metadata associated with images stored at (or referenced by) an automation action stored at a memory to determine which image is designated as the target for the input event. In other words, metadata associated with an image can include information that designates that image as a target for an input event.

The image-based application automation system then determines at block 620 whether that image satisfies a portion of a GUI. For example, using image analysis techniques or methodologies used in conventional image-based application automation systems, the image-based application automation system implementing process 600 can determine whether the image satisfies any portion of the GUI. As specific example, using image analysis techniques or methodologies such as those discussed above in relation to block 110 of FIG. 1, the image-based application automation system can access an image or other representation of the GUI, and compare the image identified at block 610 with that image or representation of the GUI.

If a portion of the GUI is satisfied by the image, the input event is performed at that portion of the GUI at block 650. For example, an input event identified or described by an input event identifier at an automation action including a target identifier used to identify the image at block 610.

If the image identified at block 610 does not satisfy any portion of the GUI at block 620, another image is selected at block 630. That is, process 600 can be executed by an image-based application automation system with respect to an automation action that includes a target identifier, an input event identifier, and a group of images (or references to images). A first image from those images can be identified as the target for the input event identified by the input event identifier, and another image from those images can be selected at block 630.

The image can be selected at block 630 according to any of a variety of methodologies. For example, as discussed above, the image can be selected based on a priority among the images; based on rules, parameters, or preferences; or using other methodologies. As a specific example, the image can be selected from those images according to timestamps associated with each of those images.

As discussed above, in some implementations, the image is selected at block 630 independent of user input. In other words, the image-based application automation system can select the image at block 630 without direction from a user to make the selection.

After the image is selected at block 630, that image is designated as the target for the input event at block 640. For example, a target identifier of an automation action representing the input event and including the image identified at block 610 and the image selected at block 630 can be modified of updated to refer to the image selected at block 630. In other words, that target identifier can be updated to designate the image selected at block 630 as the target for the input event. In other implementations, metadata related to images associated with the input event can be modified to designate the image selected at block 630 as the target for the input event. Process 600 then proceeds to block 620 to determine whether the image selected at block 630 satisfies any portion of the GUI.

As illustrated in FIG. 6, blocks 620, 630, and 640 can be repeated for a group of images associated with an input event (e.g., a group of images included in or referenced by an automation action). If no image from such a group of images satisfies any portion of the GUI, process 600 can complete. In some implementations, an image-based application automation system implementing process 600 can provide a failure or error notification to a user (e.g., at a display, via an electronic mail message, via an Short Message Service (SMS) message, via an instant message, or via some other methodology).

Process 600 illustrated in FIG. 6 is an example implementation. In other implementations, additional, fewer, or rearranged blocks or steps can be included in process 600. For example, block 640 can be moved to follow or proceed block 650. In other words, an image can be designated as the target for the input event after the image-based application automation system has determined that that image satisfies a portion the GUI.

Moreover, in some implementations, an automation action can be handled or processed multiple times during separate executions or invocations of process 600. For example, an automation action including images related to an input event can be processed during one invocation of process 600 during automated testing of an application at a first time. During that automated testing, a target identifier of that automation action can be modified as discussed above, for example, because a GUI element relative to which an input event should be performed is in a state other than the state of that GUI element represented by the image designated as the target. The automation action can then be processed again during a later invocation of process 600 during additional automated testing of the application at a second time. During this additional automated testing, the target identifier of the automated action can again be modified. For example, the target identifier can be modified to designate a different image as the target for the input event associated with the automation action if the image currently-designated as the target does not satisfy any portion of the GUI. In other implementations, the different image can be used to identify a portion of the GUI at which the input event should be performed (i.e., a portion of the GUI satisfied by the different image) if the image currently-designated as the target does not satisfy any portion of the GUI, but the different image is not designated as the target of the input event.

Figure 7:
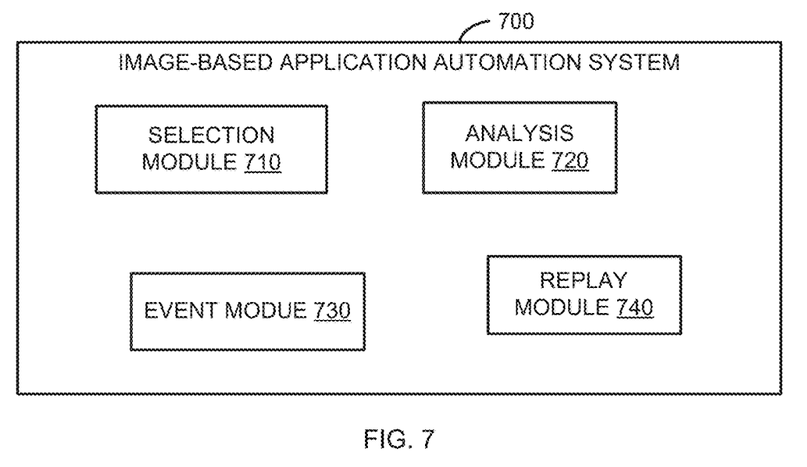
FIG. 7 is a schematic block diagram of an image-based application automation system, according to an implementation.

FIG. 7 is a schematic block diagram of an image-based application automation system, according to an implementation. Image-based application automation system 700 includes selection module 710, analysis module 720, event module 730, and replay module 740. Although various modules (i.e., combinations of hardware and software) are illustrated and discussed in relation to FIGS. 7 and 8 and other example implementations, other combinations or sub-combinations of modules can be included within other implementations. Said differently, although the modules illustrated in FIGS. 7 and 8 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Selection module 710 accesses one or more images from a group of images associated with an input event. For example, selection module 710 can select an image designated as a target for the input event based on a target identifier specified in an automation action. As another example, selection module 710 can select a second image from the group of images in response to a determination (e.g., by analysis module 720) that a first image from the group of images does not satisfy any portion of a GUI. Selection module 710 can access information related to a priority among the images and/or rules, parameters, or preferences for selecting among the image to select an image. Moreover, as discussed, above selection module 710 can select an image independent of user input. That is, for example, selection module 710 can select an image in response to a signal from analysis module 720 rather than in response to user input.

Analysis module 720 accesses images or other representations of a GUI and determines whether an image (e.g., an image selected or identified at selection module 710) satisfies any portion of the GUI. For example, analysis module 720 can use any of a variety image analysis techniques or methodologies such as those used in conventional image-based application automation systems to determine whether an image satisfies any portion of a GUI.

Additionally, analysis module 720 communicates (e.g., exchanges data or signals representing data) with selection module 710 to receive images (or references to images) from selection module 710 and provide signals or commands to selection module 710 to select additional (e.g., second, third, fourth, etc.) images from a group of images associated with an input event. Moreover, analysis module 720 can designate an image selected at block 710 as the target of an input event. For example, analysis module 720 can designate an image as the target for an input event if that image satisfies a GUI and the image currently designated as the target for the input event does not satisfy the GUI.

Event module 730 performs an input event at a portion of a GUI satisfied by an image associated with that input event. In other word, event module 730 generates or requests the input event to provide the input event to the GUI. As an example, event module 730 can request emulation or triggering of an input event such as a mouse button click event, a key down event, a gesture event, or some other input event at an operating system hosting an application at which the GUI is implemented. As another example, event module 730 can trigger an input event at a desktop sharing system or application such as Microsoft Remote Desktop Connection™ (RDC) or Virtual Network Computing (VNC) by sending a command or instruction to the desktop sharing system (e.g., to a server application of the desktop sharing system). As yet another example, event module 730 can inject a command, signal, or data set representing the input event into an input event queue for an operating system or the application at which the GUI is implemented.

In some implementations, as illustrated in FIG. 7, image-based application automation system 700 includes replay module 740. Replay module accesses automation actions, and provides data or information from those automation actions to selection module 710, analysis module 720, and to event module 730. In other words, replay module 740 can coordinate a replay phase of image-based application automation system 700.

As a specific example, image-based application automation system 700 can replay a script file to automate testing of an application that defines a GUI. Replay module 740 can access a script file including a group of automation actions, and provide information from those automation actions to selection module 710, analysis module 720, and to event module 730 to perform the automated testing. As specific example, replay module 740 can sequentially access the automation actions in the script file, and provide a target identifier and images (or references to image) to selection module 710 and analysis module 720. Additionally, replay module 740 can provide input event identifiers to event module 730, and event module 730 can perform the input events identified by those input event identifiers.

Figure 8:
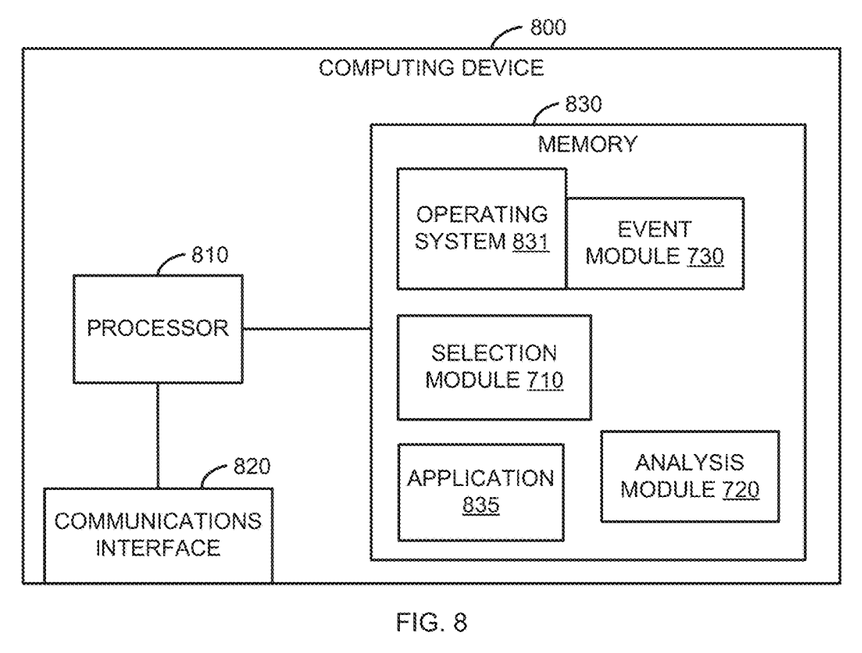
FIG. 8 is a schematic block diagram of a computing device hosting an image-based application automation system, according to an implementation.

FIG. 8 is a schematic block diagram of a computing device hosting an image-based application automation system, according to an implementation. In the example illustrated in FIG. 8, computing device 800 includes processor 810, communications interface 820, and memory 830, and hosts operating system 831, selection module 710, analysis module 720, event module 730, and application 835.

Processor 810 is any combination of hardware and software that executes or interprets instructions, codes, or signals. For example, processor 810 can be a microprocessor, an application-specific integrated circuit (ASIC), a distributed processor such as a cluster or network of processors or computing devices, a multi-core or multi-processor processor, or a virtual or logical processor of a virtual machine.

Communications interface 820 is a module via which processor 810 can communicate with other processors or computing devices via communications link. For example, communications interface 820 can include a network interface card and a communications protocol stack hosted at processor 810 (e.g., instructions or code stored at memory 830 and executed or interpreted at processor 810 to implement a network protocol). As specific examples, communications interface 820 can be a wired interface, a wireless interface, an Ethernet interface, a Fiber Channel interface, an InfiniBand interface, and IEEE 802.11 interface, or some other communications interface via which processor 810 can exchange signals or symbols representing data to communicate with other processors or computing devices.

Memory 830 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 830 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. Said differently, memory 830 can represented multiple processor-readable media. In some implementations, memory 830 can be integrated with processor 810, separate from processor 810, or external to computing device 810.

Memory 830 includes instructions or codes that when executed at processor 810 implement operating system 831, operating system 831, selection module 710, analysis module 720, event module 730, and application 835. In other words, operating system 831, an image-based application automation system including selection module 710, analysis module 720 and event module 730, and application 835 are hosted at computing device 800.

In the example illustrated in FIG. 8, application 835 is an application which an image-based application automation system including selection module 710, analysis module 720, and event module 730 can replay automation actions to automate a procedure. In other implementations, application 835 is hosted at a different computing device, and an image-based application automation system including selection module 710, analysis module 720, and event module 730 can replay automation actions representing input events at that application to automate some procedure via a communications link using, for example, communications interface 820 and a desktop sharing system.

In some implementations, computing device 800 can be a virtualized computing device. For example, computing device 800 can be hosted as a virtual machine at a computing server. Moreover, in some implementations, computing device 800 can be a virtualized computing appliance, and operating system 831 is a minimal or just-enough operating system to support (e.g., provide services such as a communications protocol stack and access to components of computing device 800 such as communications interface 820) selection module 710, analysis module 720, event module 730, and application 835.

Selection module 710, analysis module 720, and event module 730 can be accessed or installed at computing device 800 from a variety of memories or processor-readable media. For example, computing device 800 can access event selection module 710, analysis module 720, and event module 730 at a remote processor-readable medium via communications interface 820. As a specific example, computing device 800 can be a thin client that accesses operating system 831, selection module 710, analysis module 720, event module 730, and application 835 during a boot sequence.

As another example, computing device 800 can include (not illustrated in FIG. 8) a processor-readable medium access device (e.g., CD, DVD, SD, MMC, or a CF drive or reader), and can access selection module 710, analysis module 720, and event module 730 at a processor-readable medium via that processor-readable medium access device. As a more specific example, the processor-readable medium access device can be a DVD drive at which a DVD including an installation package for one or more of selection module 710, analysis module 720, and event module 730 is accessible. The installation package can be executed or interpreted at processor 810 to install one or more of selection module 710, analysis module 720, and event module 730 at computing device 800 (e.g., at memory 830). Computing device 800 can then host or execute selection module 710, analysis module 720, and event module 730.

In some implementations, selection module 710, analysis module 720, and event module 730 can be accessed at or installed from multiple sources, locations, or resources. For example, some components of selection module 710, analysis module 720, and event module 730 can be installed via a communications link, and other components of selection module 710, analysis module 720, and event module 730 can be installed from a DVD.

In other implementations, selection module 710, analysis module 720, and event module 730 can be distributed across multiple computing devices. That is, some components of selection module 710, analysis module 720, and event module 730 can be hosted at one computing device and other components of selection module 710, analysis module 720, and event module 730 can be hosted at another computing device. As a specific example, selection module 710, analysis module 720, and event module 730 can be hosted within a cluster of computing devices where each of selection module 710, analysis module 720, and event module 730 is hosted at multiple computing devices, and no single computing device hosts each of selection module 710, analysis module 720, and event module 730.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanism (e.g., sending an interface description to a scanner via a communications path or channel), pull mechanisms (e.g., delivering an interface description to a scanner in response to a request from the scanner), and store mechanisms (e.g., storing an interface description at a data store or service at which a scanner can access the interface description). Furthermore, as used herein, the term "based on" includes based at least in part on. Thus, a feature that is described as based on some cause, can be based only on the cause, or based on that cause and on one or more other causes.

What is claimed is:

1. A non-transitory computer-readable storage medium storing instructions that when executed at a processor cause the processor to:
   display, on a graphical user interface (GUI), a first element associated with an input event;
   identify, in a memory, a first image designated as a target for the input event, wherein the first image is one of a plurality of images stored in the memory that are associated with the input event, and wherein the plurality of images includes a same GUI element having different visual appearances corresponding to different states of the input event;
   in response to a determination that the first element displayed on the GUI does not match the GUI element in the first image, select a second image from the plurality of images associated with the input event; and
   in response to a determination that the first element displayed on the GUI matches the GUI element in the second image of the plurality of images, designate the second image in the memory as the target for the input event, and perform, independent of user input, the input event at the first element displayed on the GUI.

2. The non-transitory computer-readable storage medium of claim 1, wherein the visual appearance of the GUI element in the second image corresponds to a state of the input event occurred at a later time than the GUI element in the first image.

3. The non-transitory computer-readable storage medium of claim 1, wherein, prior to the plurality of images associated with the input event being stored in the memory, the instructions are executed by the processor to cause the processor to:
   display the GUI element on the GUI; and
   in response to a detection of a user input on the GUI element for the input event, capture a plurality of images of the GUI associated with the input event, store the plurality of images associated with the input event in the memory, and designate one of the plurality of captured images as the target of the input event.

4. The non-transitory computer-readable storage medium of claim 1, wherein the plurality of images, the input event, and the target of the input event are identified at an automation action stored in the memory accessible to the processor.

5. The non-transitory computer-readable storage medium of claim 1, wherein the plurality of images, the input event, and the target of the input event are identified at an automation action, and the non-transitory computer-readable storage medium further comprising instructions that when executed by the processor cause the processor to:
   modify the automation action such that the second image is the target of the input event.

6. An image-based application automation system, comprising:
   a processor;
   a non-transitory computer-readable medium storing computer-executable code that the processor executes to:
      display, on a graphical user interface (GUI), a first element associated with an input event;
      identify, in a memory, a first image designated as a target for the input event, wherein the first image is one of a plurality of images stored in the memory that are associated with the input event, and wherein the plurality of images includes a same GUI element having different visual appearances corresponding to different states of the input event;
      in response to a determination that the first element displayed on the GUI does not match the GUI element in the first image, select a second image of the plurality of images associated with the input event; and
      in response to a determination that the first element displayed on the GUI matches the GUI element in the second image of the plurality of images, designate the second image stored in the memory as the target for the input event, and perform, independent of user input, the input event on the first element displayed on the GUI.

7. The image-based application automation system of claim 6, wherein, prior to the plurality of images associated with the input event being stored in the memory, the instructions are executed by the processor to cause the processor to:
  display the GUI element on the GUI; and
  in response to a detection of a user input on the GUI element for the input event, capture a plurality of images of the GUI associated with the input event, store the plurality of captured images associated with the input event in the memory, and designate one of the plurality of captured images as the target of the input event.

8. A method comprising:
  displaying, on a graphical user interface (GUI), a first element associated with an input event;
  identifying, by a processor of a device, a first image in a memory designated as a target for the input event, wherein the first image is one of a plurality of images stored in the memory that are associated with the input event, and wherein the plurality of images includes a same GUI element having different visual appearances corresponding to different states of the input event;
  in response to a determination that the first element displayed on the GUI does not match the GUI element in the first image, selecting, by the processor, a second image of the plurality of images associated with the input event; and
  in response to a determination that the first element displayed on the GUI matches the GUI element in the second image of the plurality of images, designate the second image in the memory as the target for the input event, and performing, by the processor, the input event on the first element displayed on the GUI without user input.

9. The method of claim 8, wherein the plurality of images, the input event, and the target of the input event are identified at an automation action stored in the memory accessible to the processor, the method further comprising:
  modifying the automation action such that the second image is the target of the input event.

10. The method of claim 8, further comprising:
  in response to a determination that the first element displayed on the GUI does not match the GUI element in the second image, selecting a third image from the plurality of images and determining that the first element displayed on the GUI matches the GUI element in the third image; and
  perform, independent of user input, the input event on the first element displayed on the GUI.

11. The method of claim 8, wherein, prior to the plurality of images associated with the input event being stored in the memory, the method further comprises:
  displaying the GUI element on the GUI; and
  in response to detecting a user input on the GUI element for the input event, capturing a plurality of images of the GUI associated with the input event, storing the plurality of captured images associated with the input event in the memory, and designating one of the plurality of captured images as the target of the input event.

* * * * *